Jan. 12, 1965 F. M. SHOEMAKER ETAL 3,165,589

AMPLIFIERS AND INTERCONNECTION CIRCUITS

Filed March 23, 1961 2 Sheets-Sheet 1

INVENTORS
FRANK M. SHOEMAKER &
WILLIAM D. CAROTHERS
BY William D. Carothers
THEIR ATTORNEY INVENTORS
FRANK M. SHOEMAKER &
WILLIAM D. CAROTHERS
BY William D. Carothers
THEIR ATTORNEY

United States Patent Office 3,165,589
Patented Jan. 12, 1965

3,165,589
AMPLIFIERS AND INTERCONNECTION CIRCUITS

Frank M. Shoemaker, 2560 Noblestown Road, Pittsburgh 5, Pa., and William D. Carothers, Old Farm Road, Rosslyn Farms, Pa.

Filed Mar. 23, 1961, Ser. No. 97,783
13 Claims. (Cl. 179—39)

This invention relates generally to improvements in intercommunication circuits and more particularly to the provision of a circuit that provides a master calling control from each station for every other station when the system is supplied with a single amplifier.

Ordinary intercommunication systems cannot call all stations unless they are supplied with their own amplifier which materially increases the cost of the system. Again most intercommunication systems maintain their amplifier energized at all times. This requires a low power-consuming amplifier and one that is designed to operate the triodes at their longest possible life expectancy with good performance.

The principal object of this invention is the provision of an intercommunication system that allows each station to have master control in calling and listening at each station and providing only one amplifier which may or may not be located at one of the stations.

Another object is the provision of a circuit which is closed only when placed in use as by closing a switch and the power supply is thus completely isolated unless the power circuit is closed by a talk and listen station.

Another object is the provision of a privacy circuit which consists of a resistance in the output ground at the amplifier and a switch at the selected station which when thrown interrupts the call ground circuit and connects the same to the output ground. This resistance induces a feedback that permits one to call the selected station but prevents another station from listening to the selected station.

These objects are principally advantageous when the amplifier circuit comprises transistors and may be used with tube circuits but the latter requires time to heat the tubes for emission which is not a factor when employing transistors.

Other objects and advantages of this invention appear hereinafter in the following description and claims.

The accompanying drawings show for the purpose of exemplification without limiting this invention or the claims thereto, certain practical embodiments illustrating the principles of this invention wherein:

Figures 1, 2, 3, 4:
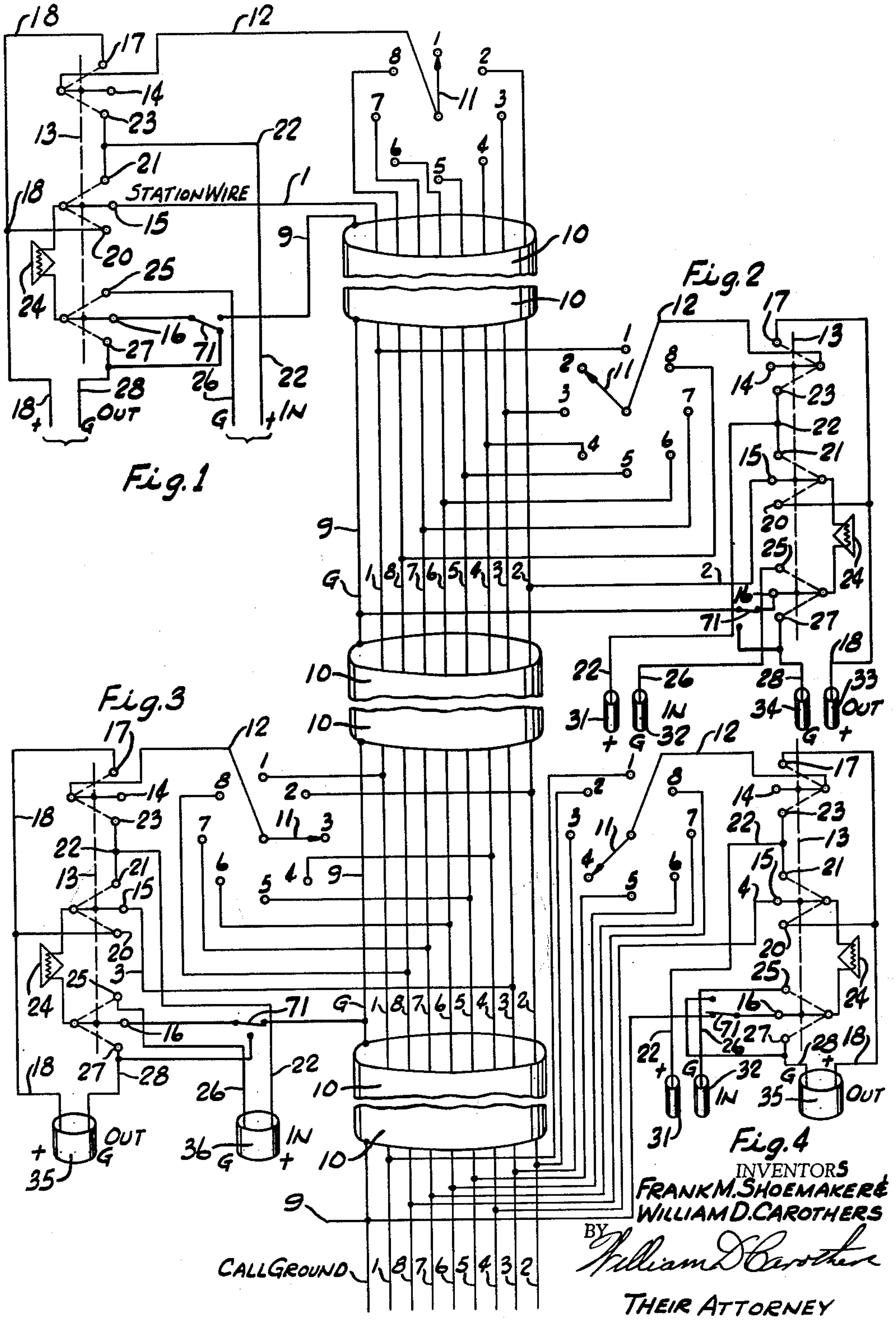
FIG. 1 is a circuit diagram of a station of a communication system having independent input and output connections.
FIG. 2 is a circuit diagram of a second station in an intercommunication system having independent shielded lines for its input and output connections.
FIG. 3 is a circuit diagram of the third station in an intercommunication system having shielded dual cables for its input and output connections.
FIG. 4 is a circuit diagram of the fourth station in an intercommunication system having its input circuit in independent shielded connections and its output in a dual shielded cable connection.

Referring to FIGS. 1 to 4 of the drawings the shielded cable indicated at 10 is shown to include enough wires to provide at least one wire for each station, which stations are indicated by the numerals 1 to 8 inclusive together with a cable shield or common ground call line as indicated at 9. As shown each station is provided with a selector switch indicated by the arm 11 for the purpose of connecting the line 12 to each of the station wires of the cable 10. The opposite end of the line 12 is connected to one pole of a three pole spring switch 13 having the three moving poles 14, 15 and 16 and which is referred to as the talk listen switch. This switch normally reposes in its center position as shown and is raised for talking and is lowered for listening and in each instance it is necessary to either raise this switch or lower this switch to talk or listen to a selected station, although the other station requires no manipulation of the switches to hear or answer the message.

The line 12 being connected to the heel of the switch 14 would in its talk position be connected to the contact 17 and the line 18 which is an output line. Line 18 is also connected to the contact 20 of the center switch 15 at the listen position.

When the switch 14 is at the talk position switch 15 connects with contact 21 and to line 22 which is an input line. This line is also connected to a contact 23 at the listen position of switch 14.

The normal position of switch 15 as illustrated connects the same with the line 1 which is the station line for the station of FIG. 1. Likewise the normal position of switch 16 connects to line 9 which is the calling ground. The heels of the switches 15 and 16 are connected to the opposite sides of the combination transmitter and speaker indicated at 24. Thus the speaker 24 is ordinarily connected to the call ground 9 and in the case of station 1 directly to the line 1 representing that station. This is true in each instance which permits any station to be called or listened upon from any other station so long as it is provided with a selector switch 11 and a talk listen switch 13. The line 9 is the cable shield.

Figure 5:
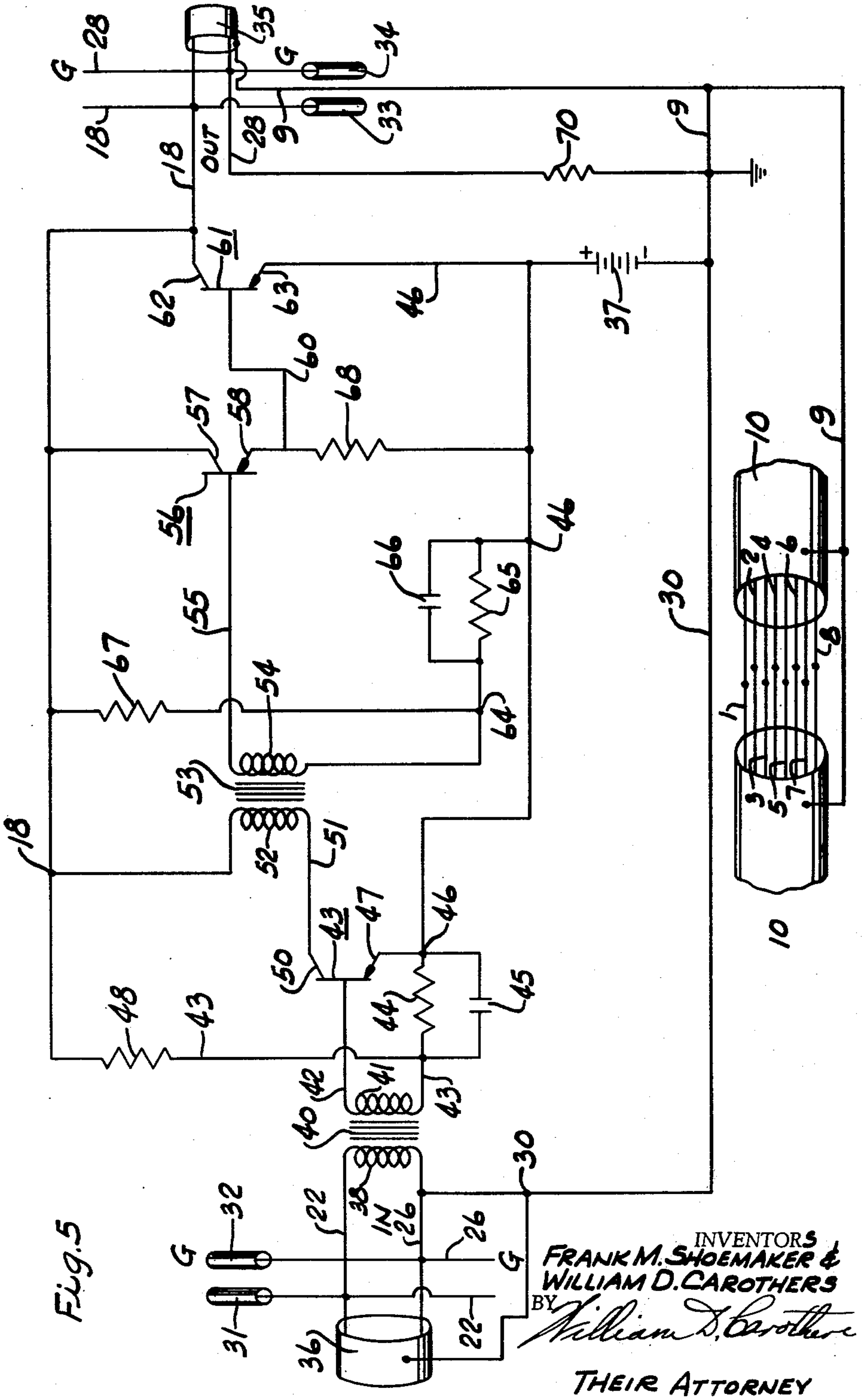
FIG. 5 is a circuit diagram of the amplifier completing the intercommunication system.

When the switch 16 is connected to the talk position it joins with the contact 25 which in turn is connected to the line 26 to the input and if the switch 16 is depressed to the listen position it connects with the contact 27 that connects with the line 28 that represents the output. Thus the microphone or speaker may be used as such by depressing the switch 13 to the talk position for the purpose of energizing the input circuit in lines 22 and 26 or the listen position to be energized from the output circuit from the lines 18 and 28. The one specific distinction between FIG. 1 and each of the other FIGURES 2 to 4 is in the manner in which the input and output lines are handled. It will be noted that the input lines 22 and 26 are independent lines and may be strung as such. The same is true as to the output lines 18 and 28. These input and output lines are connected as shown. As shown in FIG. 5 the input lines 26, the output line 28 and the call ground 9 are all connected to the common ground 30 within the amplifier. These input output lines are all independent.

Referring now to FIG. 2 wherein the structure is identical with that of FIG. 1 with the exception that the station is connected as station number 2 and the line 2 from the cable 10 is connected to the switch 15 when in its normal position. Otherwise the circuit is the same until the input and output leads are directed from this station into the location of the amplifier. In the case of station number 2 of FIG. 2 the input connections 22 and 26 are encased in the metal sheaths 31 and 32 respectively and the output connections 18 and 28 are likewise sheathed as indicated at 33 and 34 respectively. This is an improvement over that shown in FIG. 1 in that the conductors themselves may be closer together when they are provided with ground sheaths of this character as these sheaths are grounded to the wire 30 within the amplifier, whereas in the case of FIG. 1 one has to rely upon the distance between the wires or at least the distance between the input and output lines to avoid cross talk and inductive and capacitive feedback.

In the structure of FIG. 3 which represents the third station and wherein the station wire 3 is connected to the switch 15 the circuit is otherwise the same and the output lines 18 and 28 are both inserted as a dual conductor in a shielded cable indicated at 35. The input lines 22 and 26 are likewise inserted in a twin conductor ground shielded cable as indicated at 36. Here again the ground sheaths of the cables 35 and 36 are connected to the line 30 of the amplifier.

In the case of the fourth station the fourth wire or line from the cable is directly connected to the switch 15 and the input lines 22 and 26 are placed in ground sheaths 31 and 32 as in FIG. 2, whereas the output lines 18 and 28 are connected in the grounded twin conductor cable 35 as indicated in FIG. 3 which illustrates a combination of the structures as set forth in FIGS. 2 and 3.

Thus stations can be repeatedly carried by the cable 10 for each of the other stations making eight in all and of course if there were other stations to be added it would only be necessary to increase the size of the cable and the switches 11 to accommodate the same.

Referring to FIG. 5 the common ground which is represented by the connection 30 is attached to each of the grounds 9, 26 and 28 from each station and is also connected to the negative side of the battery 37 and to one side of the primary 38 of the transformer 30, the other side being connected to the lines 22 from each station which represent the potential side of the input from each station. This input is connected directly to any speaker in the talking position and by employing a microphone-speaker containing a permanent magnet field functions to generate by fluctuations a current which will modulate the primary 38 of the transformer 40 the secondary 41 of which has one end connected by means of the line 42 to the base of the transistor 43. The opposite end of the secondary 41 is connected by the line 43 to the resistance 44 and the capacitance 45 in multiple and thence to the line 46 which in turn is connected to the emitter 47 of the transistor 43. The line 46 is likewise connected to the positive side of the battery 37.

The line 43 is also connected to the resistance 48, the other side of which is connected to the line 18 or the output.

The collector 50 of the transistor 43 is connected by the line 51 to the primary 52 of the transformer 53, the other side of which is connected to the line 18.

The secondary 54 of the transformer 53 is connected by the line 55 to the base of the second transistor 56, the collector 57 of which is connected to the line 18 and the emitter 58 of which is connected by the line 60 to the base of the transistor 61, the collector 62 of which is connected to the line 18 and the emitter 63 of which is connected to the line 46 or the positive battery.

The opposite side of the secondary 54 of the transformer 53 is connected by the line 64 to the resistance 65 and the capacitance 66 in multiple which in turn are connected directly to the line 46.

The line 64 is likewise connected to one end of the resistor 67, the other end of which is connected to the line 18.

The line 60 from the emitter 58 of the transistor 56 is also connected to the resistance 68, the other end of which is connected to the line 46 thus completing the circuit.

Although the three transistors are connected to amplify one another they will not consume energy unless the station operator turns the selector switch 11 to one of the stations in the system and presses the talk listen switch. When he does this, he completes the circuit to draw current from the battery 37. When he pushes the talk listen switch upwardly to throw each of the switch members 14, 15 and 16 upwardly, then he may talk into the microphone 24. The same will be transmitted through independent lines 22 and 26 to the input of the amplifier of FIG. 5 and amplified and transmitted through the output represented by a ground 9 and the other station that he has made by selection through the arm 11. This will call the station and the operator then depresses the call switch to listen position which transfers the input in lines 22 and 26 from his speaker to the speaker of the station called and connects his speaker 24 to the output lines 18 and 28 and the operator then can listen to the station selected without disturbing the party answering which is an important improvement in this application.

In each instance it will be noted that the input to the transmitter although it comes from a distant station is at no time closely coupled with the output and when the calling station is in listening position it employs its own independent input and output circuits, thereby avoiding feedback and increased inductance to the system.

As shown in FIGS. 1 to 4 each of the four stations has a different type of handling the input and output lines. However, in each case they are either shielded or spaced from one another to avoid inductance and capacitance between input and output.

The use of the independent input and output circuits from each station directly to an amplifier is what we define as a star connection input and output circuit. To a limited degree some stations may be coupled to use the same input and output if they are not too remote from the amplifier. Such a circuit would thus employ common input and output circuits. Such a circuit would of course have limitations depending upon the distance that the stations are from the amplifier.

The best results are obtained when the amplifier is physically located intermediate all of the stations and the cable 10 and the input and output circuits are all made as star connections. Thus an independent shielded cable 10 is provided from each station to the central location where all the same wires from each station cable are joined and the shield 9 of each cable is joined as a common ground 9. This shield or call ground 9 is the only connection from the junction of the cables 10 to the amplifier as indicated at the output end of FIG. 5. The output lines 18 and 28 and the input lines 22 and 26 are preferably enclosed in the shielded cables 35 and 36, the shields of which are connected with the shield 9 of the cable 10 at the location of their star connection and thus are connected at this point only to the call ground 9 as shown in FIG. 5.

The privacy resistance 70 shown in FIG. 5 is in the ground 30 between the negative battery 37 and the output ground line 28. This is a relatively low resistance such as a fraction of an ohm and does not interfere with the normal speech between stations. However this resistance will set up enough feed back to develop a squeak if one tries to listen to a station that has the privacy switch 71 connected to output ground 28 as shown in FIG. 1. Thus a simple switch 71 and the resistance 70 in the output ground circuit of FIG. 5 will provide a listen privacy. At the same time any one station can call any other station having the privacy switch on. This system is unique and is an important object of this invention.

With the amplifier that uses no power unless a talk or listen switch is closed the battery supply which may be in the nature of nine volts is reserved for use only and eliminates waste of power and tubes or transistors which also have a use life.

The talk listen switch which has the three independent arms is biased with a spring to the center position as shown. This permits the station being operated to call and listen to the station called without any effort at the listening station. One at the station being called need not operate anything since the calling station must have its spring switch on either talk or listen to speak or hear. When the talk listen switch is released the spring moves it to the center position as shown on the drawing.

We claim:

1. An intercommunication circuit consisting of at least two stations each having a combination speaker microphone with two leads, a single amplifier, an independent positive input line with a respective independent ground line and an independent positive output line with a respective independent ground line from said amplifier to each of said stations, a common call line ground connected from each station to said amplifier, all of said grounds connected to form a common ground at said amplifier, a cable for each station having a line for each station and joined with each respective station line at a point, a selector switch for each station having a contact for each other station and connected to the corresponding station line in said cable, a selector arm for said selector switch for each station to selectively engage each station contact, a three position control switch for each station biased to move to its central position and having three independent switches each with a heel and a central contact and two alternate contacts, namely, a talk contact and a listen contact, the heels of said first and second of said switches connected respectively to said two speaker leads, the third switch heel connected to said selector arm, the central contact of said first switch of each station connected to its corresponding station line in the cable thereto, the central contact of said second switch of each station connected to said common ground call line, the talk contact of said first and second switches connected respectively to said positive line and ground line to said amplifier input, the listen contact of said first and second switches connected respectively to said positive line and ground line to said amplifier output, said talk and listen contacts of said third switch are connected respectively with said listen and talk contacts respectively of said first switch.

2. The circuit of claim 1 which also includes a resistor at said amplifier between said common ground and all of said output ground lines, and a fourth switch at each station to selectively connect said central contact of said second switch to said call line ground or said output ground line.

3. The circuit of claim 1 which also includes a shielded independent line to connect said positive input line and the positive output line to said amplifier and each station with said shields connected to said common ground at said amplifier.

4. The circuit of claim 1 characterized in that said positive line and ground line input connections from each station to said amplifier are conductors in a single shield connected to said common ground at said amplifier.

5. The circuit of claim 1 characterized in that said positive line and ground line output connections to said amplifier are conductors in a single shield connected to said common ground at said amplifier.

6. The circuit of claim 1 characterized in that said independent positive line and ground line input and said independent positive line and ground line output for each station are through independent twin conductor connections to said amplifier each with a separate shield connected to said common ground at said amplifier.

7. The circuit of claim 1 characterized in that said common line call ground is in each station wire cable.

8. An intercommunication circuit for a plurality of stations comprising an amplifier having a power supply, a common ground, independent input and output lines with their separate ground lines from said common ground of the amplifier to each station, a call line ground from said common ground directly to each station, a cable for each station having a line for each station extending from an intermediate location to each station, each respective station line in each station cable connected to each other at said intermediate location, a selection switch at each station to selectively engage the station line of every other station, a gang of three independent three-position control switches biased to move to its central position and having three independent switches each with a heel and a central contact and a talk contact and a listen contact, said input lines and output lines connected alternately to the talk and listen contacts of the first and third of said independent switches, said selection switch connected to the heel of said third independent switch, a speaker connected to the heel of said first and second independent switches, said corresponding station line connected to the central contact of said first switch, said input ground line connected to said talk contact of said second independent switch, the call line ground connected to the central contact of said second switch, and said output ground line connected to said listen contact of said second independent switch.

9. The intercommunication circuit of claim 8 characterized in that said line call ground is a shield on each cable in the system and connected to said common ground at said amplifier.

10. The intercommunication circuit of claim 8 characterized in that each input line with its separate ground line and each output line with its separate ground line being shielded with the shields connected to said common ground at said amplifier.

11. The intercommunication circuit of claim 8 characterized by a privacy switch inserted between the central contact of said second switch and said call line ground and selectively connected to said output ground line, and a resistance at said amplifier connected between said common ground and said output ground line.

12. An intercommunication power amplifier having a common ground, an input and an input ground, the latter being directly connected to said common ground, an output and an output ground, the latter being directly connected to said common ground, amplifier means between said input and said output, a plurality of stations having switch means, independent connections from each station to said input and input ground and to said output and output ground, a power source connected between said common ground and said amplifier to supply current for the same only when said input and output connections are completed at one of said station switch means remotely of said amplifier, and a privacy resistance connected between said common ground and said output ground.

13. The circuit of claim 12 characterized by each station switch means having an independent call line ground circuit connection to said common ground, and a privacy switch at each station to selectively connect each station switch means to said call line ground and said output ground line.

References Cited in the file of this patent

UNITED STATES PATENTS

| | | |
|---|---|---|
| 2,269,144 | Campbell | Jan. 6, 1942 |
| 2,275,405 | Berkley | Mar. 10, 1942 |
| 2,280,280 | Campbell | Apr. 21, 1942 |
| 2,396,691 | Galbreath | Mar. 19, 1946 |
| 2,517,960 | Barney et al. | Aug. 8, 1950 |
| 2,662,122 | Ryder | Dec. 8, 1953 |
| 3,055,979 | Shimizu | Sept. 25, 1962 |
| 3,080,454 | Weinrich et al. | Mar. 5, 1963 |